March 31, 1964   P. L. SUTCLIFFE   3,127,134
AIRCRAFT UNDERCARRIAGES
Filed March 27, 1962
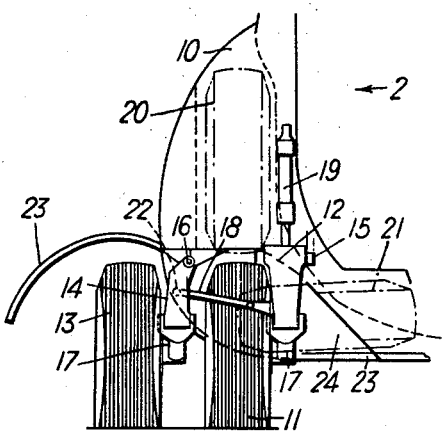
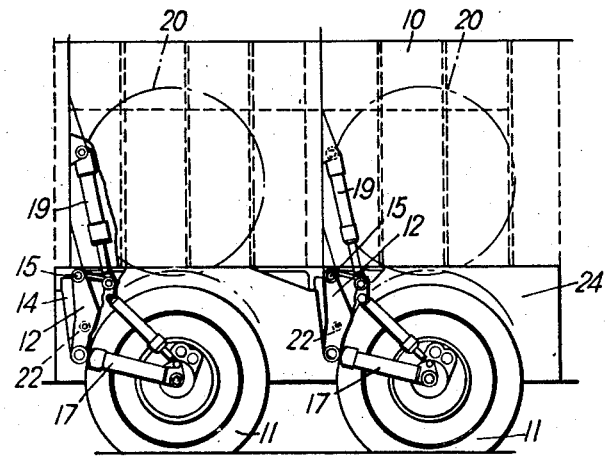
Inventor
Peter Latham Sutcliffe
By Dowell & Dowell
Attorneys United States Patent Office 3,127,134
Patented Mar. 31, 1964

3,127,134
AIRCRAFT UNDERCARRIAGES
Peter Latham Sutcliffe, Oxshott, Surrey, England, assignor to Hawker Siddeley Aviation Limited, Surrey, England
Filed Mar. 27, 1962, Ser. No. 182,770
Claims priority, application Great Britain June 26, 1961
12 Claims. (Cl. 244—102)

This invention is concerned with aircraft undercarriages and its main object is to alleviate the problem of stowage of the wheels when an undercarriage is retracted.

The problem of stowing the retracted wheels is particularly acute when the aircraft wheels are fitted with abnormally large tyres, for example in the case of an aircraft intended to operate from unprepared airfield strips. Usually bulges or blisters have to be provided on the aircraft structure in order to accommodate the wheels, and where as is commonly the case each undercarriage leg is fitted with wheels mounted side-by-side in pairs the size of the blister required can become very large.

According to the present invention, a pair of undercarriage wheels that lie side-by-side when the undercarriage is normally extended are arranged to retract in such a manner that one rises in substantially the vertical plane keeping parallel to itself while the other simultaneously turns about an axis extending fore-and-aft of the aircraft into a stowed position in which it lies in a plane at an angle to the plane of the first wheel, for example at 90° thereto or thereabouts.

To accomplish this the two wheels can be carried on separate legs pivotally connected at their upper ends to the aircraft structure, with the pivot axis of the leg of the outer wheel constituting the aforementioned fore-and-aft axis while the pivot axis of the leg of the inner wheel is substantially at right angles thereto and normal to the central vertical longitudinal plane of the aircraft or substantially so. Thus, the inner wheel will rise vertically when the leg carrying it hinges about the pivot axis at its upper end and as the inner wheel rises the outer can swing upwardly and inboard under it, about the fore-and-aft pivot axis at the upper end of its own leg, until it lies in a plane in which its axis of rotation is substantially vertical.

By coupling together the legs carrying the two wheels the motions of the two wheels can be forced to take place together and the retraction of both wheels can be performed by a single undercarriage retraction jack. A convenient way of coupling the two legs is by the use of a ball-ended link.

One arrangement in accordance with the invention is illustrated by way of example in the accompanying drawings in which:

FIGURE 1 is a diagram of an aircraft undercarriage seen in front elevation, and

FIGURE 2 is a view in the direction of the arrow 2 of FIGURE 1.

In the arrangement illustrated each of the port and starboard undercarriages of an aircraft 10 comprises four wheels furnished with extra large tyres for operation from comparatively soft runway strips, and the drawings show one of these four-wheel arrangements. The four wheels are disposed conventionally in two pairs in tandem and the general arrangement of the front and rear wheel pairs is the same so that only one pair will be described.

The inner wheel 11 of the pair is mounted on a leg 12, and the outer wheel 13 on a leg 14. The two legs 12 and 14 are pivotally connected at their upper ends to the fuselage structure at 15 and 16 respectively, with the pivot axis of the inner leg 12 lying normal to the central vertical longitudinal plane of the aircraft while the pivot axis of the outer leg 14 extends in a horizontal direction at right angles to it. The mounting of each wheel on its leg embodies a conventional trailing arm assembly 17. The two legs 12, 14 are coupled to one another by means of a link 18 that has ball-and-socket connections 22 to the legs at its opposite ends.

Retraction of the two wheels is effected by a single retraction jack 19 acting on the inner leg 12. During retraction the inner leg 12 swings up about its pivot 15 and carries the inner wheel 11 up vertically into the position indicated at 20. At the same time the outer leg 14 turns inwardly and upwardly about its pivot 16 to swing the outer wheel 13 up under the inner wheel 11 and into the stowed position indicated at 21. Doors 23 close the undercarriage bay 24 when the undercarriage is fully retracted. It will be seen that in the stowed positions the two wheels lie in planes substantially at right angles to one another and only one is turned under the fuselage structure, the other being raised into a stowage position at the side of the fuselage. Consequently, the wheel bay needs to be not nearly so deep as in the case where the two wheels maintain a parallel relationship upon retraction. The arrangement makes it possible to accommodate the large diameter tyres in a relatively small undercarriage fairing, with comparatively straightforward structural connection to the frames of the basic fuselage structure.

The ball-ended link 18, besides serving as a side brace for the outer leg, forces the outer leg to swing in the required manner when the retraction jack 19 raises the inner leg 12.

The mounting of all four wheels on separate legs in the arrangement illustrated gives an undercarriage that is particularly suited for operation from unprepared airfield strips. However, while the invention has been described in this context and in its application to an undercarriage in which the wheels are fitted with abnormally large tyres, it is to be understood that it is not limited to this case. If the invention is applied in an arrangement where tyres of a more usual size are used the room required for wheel stowage will be correspondingly smaller. Also, whereas in many cases it is necessary to provide local modifications of the fuselage shell configuration in the region of the undercarriage in order to provide room for wheel bays, this would not be necessary in all cases.

I claim:

1. An aircraft undercarriage comprising, in combination, a fuselage structure, a first undercarriage leg mounted at its upper end on said fuselage structure by means of a pivotal connection of which the pivot axis extends in the fore-and-aft direction of said structure, a first ground wheel carried at the lower end of said first undercarriage leg, a second undercarriage leg alongside said first leg and mounted at its upper end on said fuselage structure by means of a pivotal connection of which the pivot axis extends transversely of said structure substantially at right angles to said pivot axis of said first leg, a second ground-wheel carried at the lower end of said second undercarriage leg, powered retraction means connected to one of said legs, and a link coupling the two legs to one another whereby, upon retraction, rising of said second wheel by turning of said second leg about the pivot axis thereof is accompanied by simultaneous rising and turning of said first wheel about the pivot axis of said first leg into a space under, and formerly occupied in part by, said second wheel.

2. An undercarriage according to claim 1, wherein said first undercarriage leg is disposed outboard of said second leg, and said first ground wheel is outboard of said second ground wheel.

3. An undercarriage according to claim 1, and wherein said link has ball-and-socket connections to said first and second legs on its opposite ends.

4. An undercarriage according to claim 1, wherein said powered retraction means comprises a single retraction jack connected between said fuselage structure and one of said legs.

5. An undercarriage according to claim 1, wherein the fuselage structure incorporates a first wheel bay at the side thereof and a second wheel bay underneath, said first ground wheel rising, on retraction, into said second wheel bay and said second ground wheel rising into said first wheel bay.

6. An undercarriage according to claim 1, and further comprising an additional assembly of first and second undercarriage legs and first and second ground wheels cooperatively associated with one another and with the fuselage structure in like manner to the legs and ground wheels aforesaid and disposed in tandem relationship with said legs and ground wheels aforesaid.

7. An aircraft undercarriage comprising, in combination, a fuselage structure, first undercarriage mounting means hingedly connected at an upper portion thereof to said fuselage structure for angular movement in an upright plane transverse to the fore-and-aft axis of said fuselage structure, a first ground wheel carried on a lower portion of said first mounting means, second undercarriage mounting means alongside said first mounting means and hingedly connected at an upper portion thereof to said fuselage structure for angular movement in an upright plane extending fore-and-aft with respect to said fuselage structure, a second ground wheel carried on a lower portion of said second mounting means, and retraction means operatively connected to the fuselage structure and said first and second mounting means whereby, upon retraction, rising of said second wheel by hinging of said second mounting means is accompanied by simultaneous hinging of said first mounting means and rising and turning of said first wheel into a stowed position in which said first wheel lies in a plane at an angle to the plane of said second wheel.

8. An undercarriage according to claim 7, wherein said first mounting means is disposed outboard of said second mounting means, and said first ground wheel is outboard of said second ground wheel.

9. An undercarriage according to claim 7, wherein a single retraction jack is connected between said fuselage structure and one of said mounting means, and a coupling linkage is provided between said first and second mounting means whereby said single retraction jack is operative to retract both mounting means, and the wheels thereof, simultaneously.

10. An undercarriage according to claim 9, wherein said coupling linkage comprises a link with ball-and-socket connections to said first and second mounting means at its opposite ends.

11. An undercarriage according to claim 7, wherein said fuselage structure has a first wheel bay alongside it and a second wheel bay under it, said first ground wheel rising on retraction into said second bay and said second ground wheel rising into said first bay.

12. An undercarriage according to claim 7, further comprising a second assembly of first and second mounting and first and second ground wheels cooperatively associated with one another and with the fuselage structure in similar fashion to those aforesaid and disposed in tandem therewith.

References Cited in the file of this patent

UNITED STATES PATENTS 2,360,759    Chalberg _____ Oct. 17, 1944

FOREIGN PATENTS 718,047    Germany _____ Feb. 28, 1942